Oct. 29, 1940.   L. F. CARTER   2,219,295
PNEUMATIC ERECTION DEVICE FOR GYROSCOPES
Filed March 18, 1939
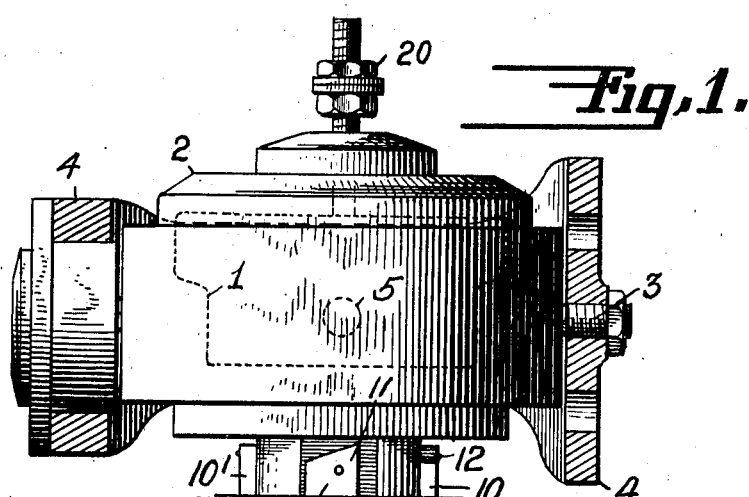
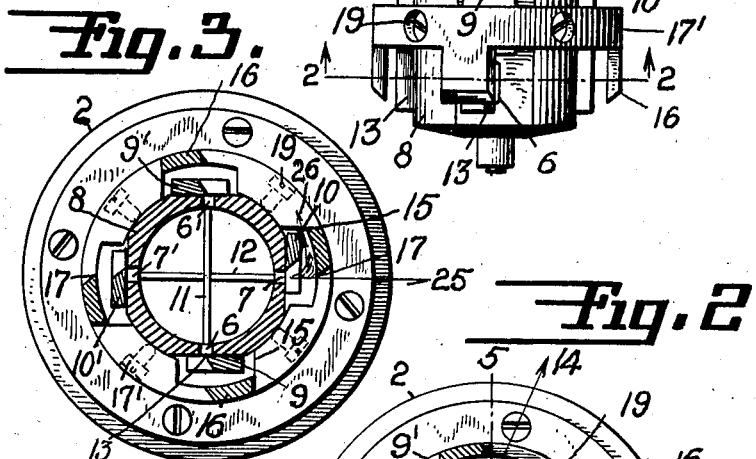
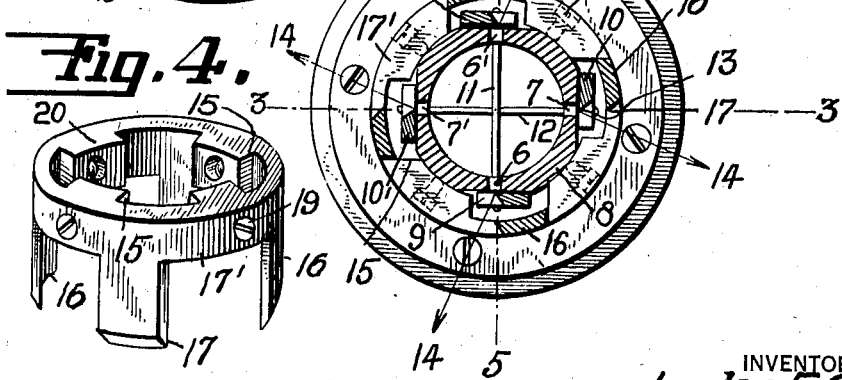
INVENTOR
Leslie F. Carter
BY
HIS ATTORNEY Patented Oct. 29, 1940

2,219,295

UNITED STATES PATENT OFFICE 2,219,295

PNEUMATIC ERECTION DEVICE FOR GYROSCOPES

Leslie F. Carter, Leonia, N. J., assignor to Sperry Gyroscope Company, Inc., Brooklyn, N. Y., a corporation of New York Application March 18, 1939, Serial No. 262,628

5 Claims. (Cl. 74—5)

REISSUED
JAN 13 1942

This invention relates to gyroscopic artificial horizons or gyro-verticals for maintaining a horizontal reference plane on rapidly moving vehicles, such as aircraft or ships, and has special reference to the type or gyro-vertical which is mounted in substantially neutral equilibrium and which is erected by a source of power, such as air jets, controlled by the relative inclination of the gyroscope and one or more gravitational factors, such as pendulums, my invention having special application to the general type of gyro-vertical shown in the prior patent to Bert G. Carlson, No. 1,982,636, dated December 4, 1934.

It is well known that such gyroscopes are subject to displacement from the vertical due to and following a turn or other acceleration of the aircraft, and that the amount of such error is, in general, proportional to the maximum erection rate for which the gyroscope is designed. On the other hand, a substantial decrease in the normal average erection rate of the gyroscope, while lessening such error, would at the same time retard the quickness of recovery of the gyroscope and so reduce the erecting force when the gyroscope is almost vertical as to cause wandering about the true vertical. From this it follows that a reduction of such erection rate as by increasing the speed and/or weight of the rotor, is not a complete or entirely satisfactory solution of the problem.

I am also aware that to overcome the above named difficulty, it has been proposed to eliminate the erection during turns. This, however, involves auxiliary apparatus and moving remotely controlled parts on the gyroscope, etc., which leads to complication, extra weight and expense, and adds to the balancing difficulties.

According to my invention, I propose to provide a simple means for reducing the maximum erection force which is exerted on the gyroscope without affecting the erection force exerted under small relative tilts of the gyroscope and pendulums. By this means the accuracy of erection remains undisturbed and wandering does not arise and at the same time the amount of error during the turn when the maximum erection force would otherwise be exerted is greatly reduced. For this purpose I propose to use a system of air flow spoilers or baffles which intersect the air stream from the erection ports only when such ports are approaching the wide open position, in other words, only when the pendulums are swung out to a substantial angle due to marked turn.

My invention also has application to other types of gyroscopes which employ air jet erection or damping controlled by pendulous factors of any type.

Referring to the drawing, showing one form my invention may assume,

Fig. 1 is a side elevation, partly in section, of a gyro-vertical or gyroscopic artificial horizon, the gimbal mounting being shown in section and the outer casing removed.

Fig. 2 is a section taken substantially on line 2—2 of Fig. 1, looking in the direction of the arrows but omitting the gimbal ring.

Fig. 3 is a similar section, but showing the pendulums in the position they would assume in case of a turn.

Fig. 4 is a detailed perspective view of the spoiler which is added to the gyroscope according to my invention.

The gyroscope shown in Fig. 1 comprises a rotor 1 (shown in dotted lines) mounted to spin on a vertical axis within the rotor bearing casing 2. Said rotor may be spun by any suitable means, such as air under pressure or electricity. Said casing is mounted for oscillation about a horizontal axis 3—3 in bearings in a gimbal ring 4. Said gimbal ring, in turn, is mounted for oscillation about horizontal axis 5—5, which is normal to the axis 3—3.

If air under pressure is used to spin the rotor, it is admitted through hollow trunnions on axes 5—5 and 3—3, respectively, in a manner well known in the art, such as shown in the aforementioned patent to Carlson #1,982,636. The used air escapes through a plurality of ports 6, 6' and 7, 7' in a downward hollow extension 8 on the bottom of the gyro casing. If the gyroscope is electrically spun, the outward air flow through said ports is maintained by the spinning of the rotor itself, which may be equipped with an impeller for this purpose, if desired.

The aforesaid ports are preferably in line with the axes 3—3 and 5—5, respectively, and it is the practice to employ the same for erection purposes by differentially intercepting the air flow therefrom upon relative tilt of the gyroscope and small pendulums preferably pivoted thereon. For this purpose it is the practice to employ two pairs of pendulums 9, 9' and 10, 10', the pair 9, 9' being secured to a cross shaft 11 pivoted across the said extension, and the pair 10, 10' being secured to shaft 12 extending at right angles to said shaft 11. Said pendulums are hung so that their respective knife edges 13 normally bisect the air streams issuing from the respective ports (see Fig. 2). Upon relative tilt of the gyroscope and pendulum about the axis 3—3, for instance, one pendulum, 10', is moved to open the port 7', while the opposite pendulum 10 is moved to close the port 7, resulting in a differential air erection about the axis 5—5 to erect the gyroscope about the axis 3—3.

I have found experimentally that when the pendulums are in their normal position, as shown in Fig. 2, the air streams are deflected through a substantial angle, as shown by the arrows 14 in Fig. 2. As, however, a pendulum is moved to further open the port, the deflection becomes less and less until, when the port is wide open, the air stream is substantially normal to the plane of the jet, i. e., parallel to the axis perpendicular to the tilt.

I have also found experimentally that during normal straight flight operation, the inclination of the gyroscope seldom if ever exceeds one or two degrees. On the other hand, during turns or rapid acceleration of the craft, the pendulums swing out until they strike limit stop 15, hereinafter described, thus fully opening the ports. It is at this time that the gyroscope is most seriously disturbed, since the complete swing out of the pendulums under acceleration forces exerts the maximum erecting torque on the gyroscope, thus causing the gyroscope to drift off at the maximum rate of erection for which the instrument is designed. In order to reduce this error and at the same time not interfere with the proper erection of the gyroscope during normal operation, I place adjacent each port a spoiler or baffle 16, the effective knife edge 17 of which normally intercepts a goodly portion 26 of the air stream 25 from each port when the air stream is issuing normally to said port—in other words, when the adjacent shutter is approaching the wide open position. On the other hand, during normal operation, when the gyroscope and pendulums are both substantially vertical, the spoilers are inoperative due to the fact that the air jets under these circumstances are deflected as shown in Fig. 2. Therefore the erecting torque applied to the gyroscope during the small tilt which normally occurs, remains unaffected. On the other hand, large disturbing forces due to turns or accelerations are greatly reduced by the spoilers.

While said spoilers are primarily needed in connection with the pendulums, which are affected by turns, i. e., those pivoted to swing athwartships, I prefer to use said spoilers for all four pendulums because the other pair are affected during change of speed of the aircraft and because the gyroscope is not always mounted on the aircraft in the same manner. The spoilers may preferably be all secured to a common ring 17', which is shown as adjustably secured to the downward extension 8 from the gyroscope, as by means of set screws 19. In this way the spoiler ring may be adjusted up and down to effect the proper balance in connection with the adjustable counterbalancing mass 20 and it may be adjusted angularly around the extension 8 until each knife edge lies in the proper position with respect to the adjacent jet and pendulum.

Preferably, stop shoulders 15 are placed behind each pendulum a small distance so as to limit its backward swing to the full open position of the port. This has the advantage among others of preventing the pendulum on the opposite side from swinging past the port and opening it on the side of the pendulum opposite the knife edge. Said shoulders may be provided by inward projections 20 on the spoiler ring 17'.

Another important advantage in placing the stops close to the pendulums relates to the system of balancing the gyroscope employed. A study of the action of the pivoted pendulums on the center of gravity of the gyroscope will show that under the action of lateral acceleration forces parallel to axis 3—3, for instance, pendulums 10, 10' cannot pivot on shaft 12 and therefore act as fixed masses on the case, thus, in effect, lowering the center of gravity slightly. Also, under the same conditions, pendulums 9, 9' will swing against one of the abutments 15 and therefore also act as a fixed mass to lower the center of gravity. Therefore I prefer to balance the gyroscope about axes 3—3 and 5—5 so that when vertical and at rest, it is slightly top heavy, but the moment horizontal acceleration forces act thereon due to turn or change of speed, the center of gravity will be lowered to coincide with the center of pivotal support due to the above described action on the pendulums. By placing the stops close to the pendulums, this action arises almost instantaneously at the start of a turn, and therefore the gyro is in neutral equilibrium during the action of disturbing forces.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

Having described my invention, what I claim and desire to secure by Letters Patent is:

1. In a neutrally mounted gyroscope having air jet erecting means, opposed ports in said gyroscope for the jets, pendulous cut-off means adjacent each port, and a spoiler or baffle mounted on said gyroscope beyond each pendulum and adapted to intercept at least a portion of said jet as said pendulum uncovers a substantial portion of the adjacent port, but not intercepting said jet in the normal position of said pendulum.

2. Erecting means for gyroscopes as claimed in claim 1 having two pairs of opposed jets and two pairs of pendulums therefor and a baffle for each jet.

3. An attachment for air erected gyro verticals having a plurality of erecting ports and cooperating pendulums in a downward hollow projection therefrom, comprising a ring adapted to encircle the bottom of said projection, said ring having downwardly projecting baffles one for each port, beyond the adjacent pendulum and substantially bisecting the jet from each port when said jet is uncovered by its pendulum.

4. An air erected gyro-vertical as claimed in claim 3 in which said ring is provided with shoulders acting as stops to limit the backward swing of each pendulum.

5. In a gyro vertical, a universally suspended gyroscope mounted in substantially neutral equilibrium, pendulous means pivoted thereon, air jet torque means controlled thereby for erecting the gyroscope, stops for said pendulous means to limit their movement, said gyroscope being balanced in its universal suspension with the pendulous means locked to the gyroscope, and baffle means beyond said pendulous means adapted to intercept at least a substantial portion of the air jet when said means is against its stop.

LESLIE F. CARTER.